UNITED STATES PATENT OFFICE.

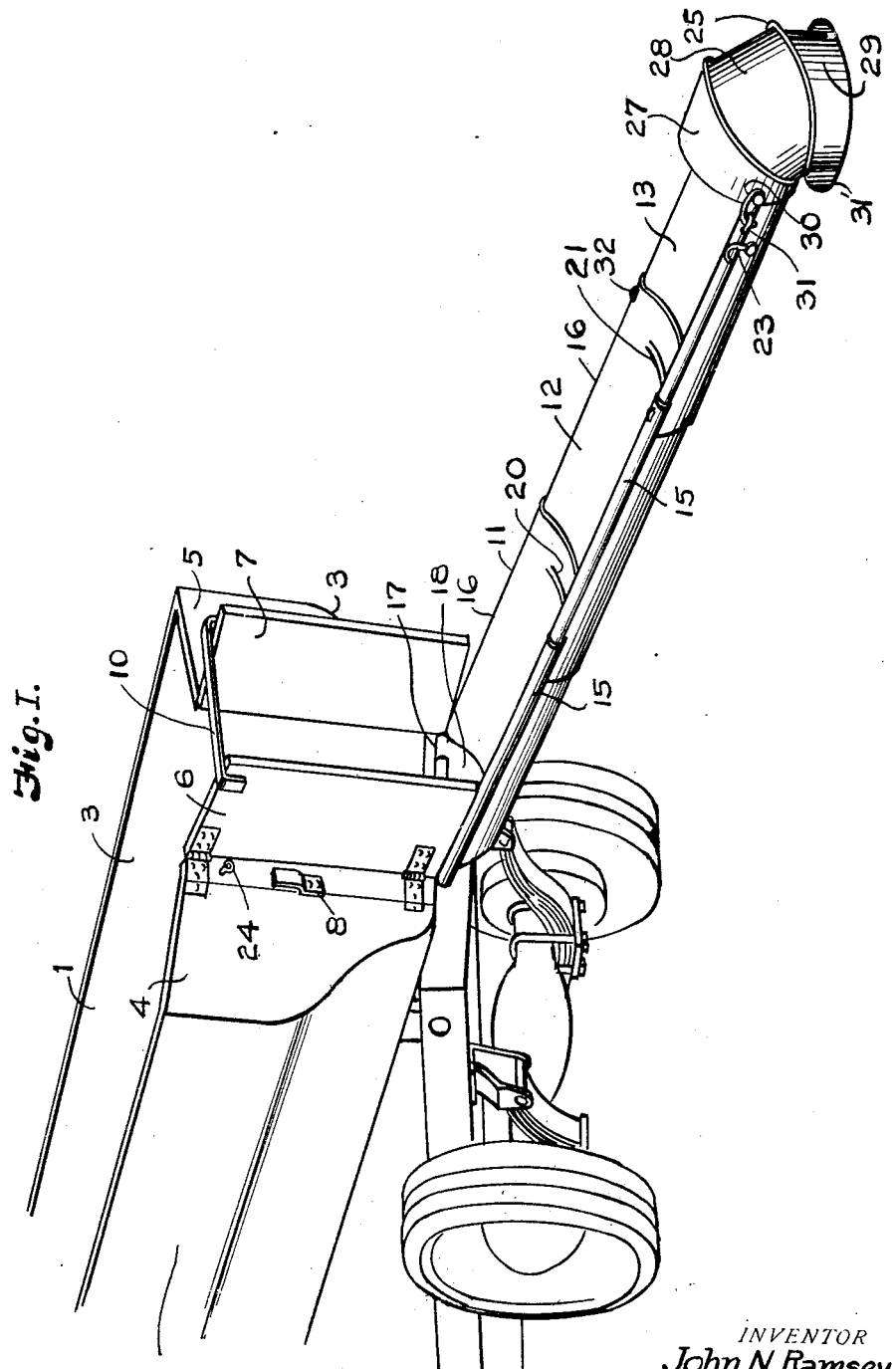

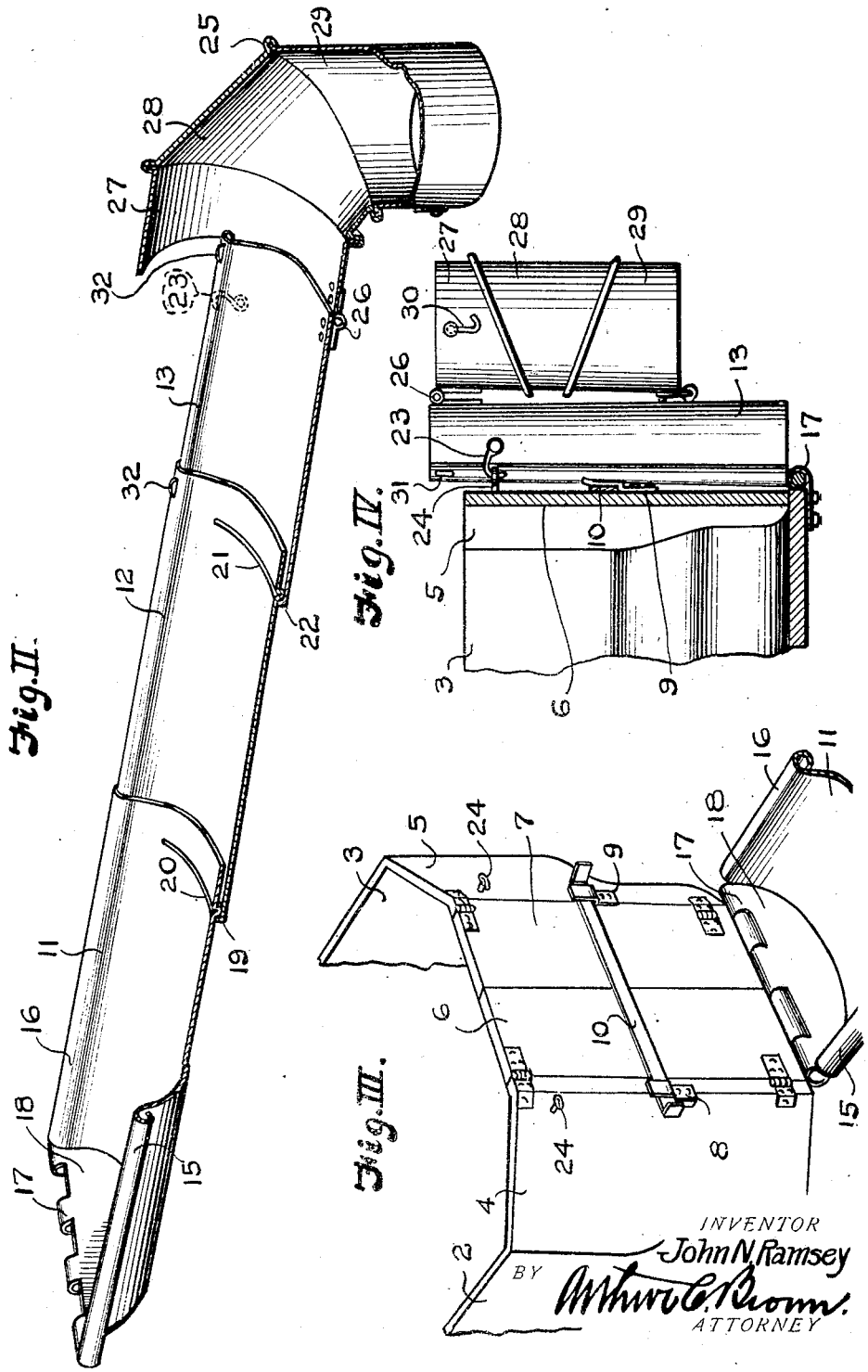

JOHN N. RAMSEY, OF KANSAS CITY, MISSOURI.

ADJUSTABLE CHUTE AND END-GATE.

1,364,581.   Specification of Letters Patent.   Patented Jan. 4, 1921.

Application filed March 26, 1919. Serial No. 285,318.

*To all whom it may concern:*

Be it known that I, JOHN N. RAMSEY, a citizen of the United States, residing at Kansas City, in the county of Jackson and State of Missouri, have invented certain new and useful Improvements in Adjustable Chutes and End-Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a chute for vehicles adapted to convey grain, coal and the like, and the primary object of the invention is to provide an improved chute adapted to permit the transposition of material from the vehicle to a manhole in the sidewalk without liability of distributing the material upon the pavement. The invention also contemplates the provision of means whereby the material will be guided into the openings in the side of a building, as, for example, a window or other similar opening, and it is also the purpose of my invention to provide a chute consisting of telescopic sections which may be inexpensively constructed, which will be durable and efficient, and which may be conveniently carried by the vehicle in transit.

Other objects and advantages of the invention will be referred to hereinafter, it being understood that changes in form, proportion and minor details of construction may be resorted to without departing from the spirit of the invention or sacrificing any of its advantages.

In the drawings—

Figure I is a perspective view of a vehicle of approved construction to which my invention is attached, the chute being shown in its extended position with a hood or nozzle in the manhole.

Fig. II is a view partly in elevation and partly in section, of the chute detached.

Fig. III is a detail perspective view of the end of the vehicle, and

Fig. IV is a sectional view through the end of the vehicle, the chute being shown in elevation in its collapsed position.

Referring now to the drawings by numerals of reference:

1 designates a vehicle preferably provided with inclined sides 2 and 3 and the rear end of the vehicle is adapted to be closed by inwardly projecting walls 4 and 5 spaced apart to provide a central opening closed by the hinged gates 6 and 7. Carried by the inwardly projecting walls 4 and 5 are cleats 8 and 9 adapted to receive a locking bar 10 whereby the gates will be held in a closed position, the gates being adapted to open outwardly toward the chute hinged to the bottom of the vehicle. The chute is made up of a plurality of sections as, for example, 11, 12 and 13, each of which is trough-shaped or concavo-convex with their upper edges, for example, 15 and 16, turned over to form beads or barrels, the bead of one section being telescopically received within the bead of the other section, each section being slightly smaller at one end than the other so that the next succeeding section may nest with relation thereto. The section 11 is hinged to the bottom of the vehicle by a hinge 17 and is provided with an end-wall 18, as best shown in Figs. II and III. The intermediate section is provided with an upturned end 19 adapted to engage a rib 20 on the section 11 when section 12 is telescoped, section 12 being correspondingly ribbed as at 21 to engage the up-turned end 22 of section 13 when section 13 is telescoped. Section 13 is provided with hooks 23 adapted to engage the eyes 24 on the end of the vehicle to hold the chute in a collapsed position close to the vehicle in transit and the end section 13 is provided with a nozzle or hood 25 which is hinged thereto at 26 and which may consist of a plurality of flexibly jointed sections 27, 28 and 29 so that the end 29 may be turned at any angle. The section 27 of the nozzle or hood is also provided with hooks 30 to engage the eyes 31 on the section 13.

When the parts are properely assembled and it is desired to discharge the material from the vehicle 1, the sections will be extended, as shown in Fig. I, and if the material is to be deposited in a manhole 31', the nozzle or hood will assume the position shown in Figs. I and II with the end 29 in the manhole. The gates 6 and 7 will then be opened and act as guiding side walls for the material in the vehicle so that liability of the material spilling sidewise due to the line of flow of the material will be eliminated.

When the material is to be deposited through a horizontal opening, the section 29 can be swung to a horizontal position in an obvious manner.

When the vehicle is loaded and ready for transit, the gates will be closed, as shown in Figs. III and IV, and the sections 12 and 13 will be telescoped upon the section 11 with the hood or nozzle lying thereagainst, as shown in Fig. IV with the hook 23 engaging the eyes 24. When the vehicle reaches the point of distribution of the material, the hooks 23 may be unhooked from the eyes 24, the sections 12 and 13 extended and the hood hooked in place, as shown in Figs. I and II.

From the foregoing it will be apparent that the device may be quickly rendered effective or ineffective by a single operator in a most convenient manner and that the device is not only efficient in operation but that it is inexpensive to manufacture and is well adapted to perform the functions for which it is intended.

If desired, the beads on one telescopic section may be provided with pressed-out portions 32 to coincide with similar portions on a section telescoped within the same whereby the pressed-out portions will cooperate with the parts 21 and 22 to interlock therewith to prevent the sections from rattling when they are collapsed and in the position shown in Fig. IV.

Having thus described my invention, what I claim as new therein, and desire to secure by Letters-Patent is:

1. A chute comprising a plurality of telescopic sections, means for hinging one of the sections to the body of a vehicle, a nozzle hingedly connected to the end of the last section and comprising flexibly jointed ring members, and means for fastening one of the ring members rigidly with respect to the last section.

2. A chute consisting of a plurality of telescopic sections, each of which has a longitudinal, transversely curved, substantially tubular edge to form a hollow bead, the bead of one section being slidable within the bead of an adjacent section, and means for limiting the outward sliding movement of one section with respect to the other, said means consisting of a struck-up lug formed in the curved bead of one section and engageable with a struck-up, recessed portion in the bead of a complementary section.

3. A chute consisting of a plurality of telescopic sections, each of which has a longitudinal, transversely curved, substantially tubular edge to form a hollow bead, the bead of one section being slidable within the bead of an adjacent section, means for limiting the outward sliding movement of one section with respect to the other, said means consisting of a struck-up lug formed in the curved bead of one section and engageable with a struck-up, recessed portion in the bead of a complementary section, and transverse inter-locking ribs on adjacent sections.

In testimony whereof I affix my signature.

JOHN N. RAMSEY.